(12) United States Patent
Ji et al.

(10) Patent No.: US 9,698,966 B2
(45) Date of Patent: Jul. 4, 2017

(54) DYNAMIC TDD OPERATION METHOD AND APPARATUS FOR USE IN WIRELESS COMMUNICATION SYSTEM

(71) Applicant: Samsung Electronics Co., Ltd., Gyeonggi-do (KR)

(72) Inventors: Hyoungju Ji, Seoul (KR); Seunghoon Choi, Gyeonggi-do (KR); Youngbum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 14/276,456

(22) Filed: May 13, 2014

(65) Prior Publication Data
US 2014/0341091 A1 Nov. 20, 2014

(30) Foreign Application Priority Data
May 15, 2013 (KR) .......................... 10-2013-0055285

(51) Int. Cl.
*H04J 3/00* (2006.01)
*H04L 5/14* (2006.01)
*H04L 5/00* (2006.01)

(52) U.S. Cl.
CPC .......... *H04L 5/1469* (2013.01); *H04L 5/0053* (2013.01); *H04L 5/0055* (2013.01); *H04L 5/0057* (2013.01)

(58) Field of Classification Search
CPC H04B 17/382; H04B 17/318; H04B 17/0057; H04B 17/0077; H04L 5/0007;
(Continued)

(56) References Cited

U.S. PATENT DOCUMENTS

2010/0080166 A1* 4/2010 Palanki ................ H04B 7/2606
370/315
2010/0211845 A1* 8/2010 Lee ........................ H04L 1/1854
714/749
(Continued)

FOREIGN PATENT DOCUMENTS

KR WO 2013005970 A2 * 1/2013 ............. H04L 5/001
WO WO 2012/043937 4/2012
(Continued)

OTHER PUBLICATIONS

Zukang Shen et al., "Dynamic Uplink-Downlink Configuration and Interference Management in TD-LTE", IEEE Communications Magazine, Nov. 2012.
(Continued)

*Primary Examiner* — Khaled Kassim
*Assistant Examiner* — Berhanu Belete
(74) *Attorney, Agent, or Firm* — The Farrell Law Firm, P.C.

(57) ABSTRACT

A method and apparatus are provided for signal transmission and reception in a Time Division Duplex (TDD) system. The method includes receiving, from a base station, first configuration information including an uplink reference Uplink-Downlink (UL-DL) configuration; receiving, from the base station, second configuration information including a downlink reference UL-DL configuration; receiving, from the base station, third configuration information including an equivalent UL-DL configuration based on the first configuration information and the second configuration information; and communicating signals with the base station based on the third configuration information.

20 Claims, 12 Drawing Sheets

(58) Field of Classification Search
CPC ... H04L 5/1469; H04L 5/0094; H04L 5/0058; H04L 5/0053; H04W 24/00; H04W 72/04
USPC .......................................................... 370/280
See application file for complete search history.

(56) References Cited

U.S. PATENT DOCUMENTS

| | | | | |
|---|---|---|---|---|
| 2011/0149813 A1* | 6/2011 | Parkvall | .............. | H04B 7/2656 370/280 |
| 2012/0093040 A1* | 4/2012 | Wu | .................. | H04W 72/1268 370/279 |
| 2012/0176957 A1* | 7/2012 | Chen | ..................... | H04B 7/155 370/315 |
| 2012/0257554 A1* | 10/2012 | Kim | ........................ | H04L 5/001 370/280 |
| 2012/0300641 A1* | 11/2012 | Chen | ..................... | H04L 1/0026 370/241 |
| 2013/0155898 A1* | 6/2013 | Yin | ....................... | H04L 1/0026 370/254 |
| 2013/0155915 A1* | 6/2013 | Park | .................... | H04W 72/042 370/280 |
| 2013/0176886 A1* | 7/2013 | Joung | .................. | H04W 24/00 370/252 |
| 2013/0194982 A1* | 8/2013 | Fwu | .................. | H04W 72/0493 370/280 |
| 2013/0272169 A1* | 10/2013 | Wang | ................ | H04W 72/0446 370/280 |
| 2013/0272170 A1* | 10/2013 | Chatterjee | ............. | H04W 28/02 370/280 |
| 2013/0315114 A1* | 11/2013 | Seo | ......................... | H04L 5/001 370/280 |
| 2013/0322343 A1* | 12/2013 | Seo | ...................... | H04W 24/02 370/328 |
| 2014/0086116 A1* | 3/2014 | Seo | ...................... | H04W 72/14 370/280 |
| 2014/0086119 A1* | 3/2014 | Yang | .................... | H04L 5/0007 370/280 |
| 2014/0122957 A1* | 5/2014 | Charbit | ..................... | H04L 1/08 714/748 |
| 2014/0126434 A1* | 5/2014 | Li | ............................ | H04L 5/14 370/280 |
| 2014/0160967 A1* | 6/2014 | Gao | ...................... | H04W 24/10 370/252 |
| 2014/0185539 A1* | 7/2014 | Seo | ...................... | H04B 7/2656 370/329 |
| 2014/0247801 A1* | 9/2014 | Oizumi | ................. | H04L 5/0037 370/329 |
| 2014/0301336 A1* | 10/2014 | Kim | ........................ | H04L 5/001 370/329 |
| 2014/0334351 A1* | 11/2014 | Yin | ....................... | H04L 5/0091 370/280 |
| 2014/0348039 A1* | 11/2014 | Park | ....................... | H04L 5/0007 370/280 |
| 2014/0348098 A1* | 11/2014 | Lee | ....................... | H04L 5/1469 370/329 |
| 2015/0055584 A1* | 2/2015 | Lee | ..................... | H04W 72/042 370/329 |
| 2015/0110082 A1* | 4/2015 | Sun | ....................... | H04L 1/1854 370/336 |
| 2015/0189610 A1* | 7/2015 | Siomina | .................. | G01S 5/021 370/280 |
| 2015/0257130 A1* | 9/2015 | Lee | ..................... | H04W 72/042 370/336 |
| 2016/0021655 A1* | 1/2016 | Seo | ....................... | H04L 1/1829 370/280 |
| 2016/0149687 A1* | 5/2016 | Lei | ........................ | H04W 16/10 370/280 |

FOREIGN PATENT DOCUMENTS

| | | |
|---|---|---|
| WO | WO 2013/002591 | 1/2013 |
| WO | WO 2013/046619 | 4/2013 |

OTHER PUBLICATIONS

Sharp, "Comparison Between Explicit and Implicit Signaling for eIMTA Reconfiguration/Subframe Direction", R1-132353, 3GPP TSG RAN WG1 Meeting #73, May 20-24, 2013, 5 pages.

Nokia Siemens Networks, Nokia, "Reference Configuration Method for Dynamic UL-DL Reconfiguration," R1-132298, 3GPP TSG-RAN WG1 Meeting #73, May 20-24, 2013, 4 pages.

European Search Report dated Nov. 11, 2016 issued in counterpart application No. 14797709.4-1851, 9 pages.

* cited by examiner

DYNAMIC TDD OPERATION METHOD AND APPARATUS FOR USE IN WIRELESS COMMUNICATION SYSTEM

PRIORITY

This application claims priority under 35 U.S.C. §119(a) to Korean Patent Application Serial No. 10-2013-0055285, which was filed in the Korean Intellectual Property Office on May 15, 2013, the entire disclosure of which is incorporated herein by reference.

BACKGROUND

1. Field of the Invention

The present invention relates generally to a Time Division Duplex (TDD) operation method and apparatus in a wireless communication system, and more particularly, to a technology with which a base station changes configuration information for dynamically adjusting uplink and downlink resource amounts to control uplink and downlink transmission/retransmission timing and notify of the timing based on the configuration information.

2. Description of the Related Art

Long Term Evolution (LTE) is a technology for realizing high-speed packet-based communications with a data rate of up to 100 Mbps, which is higher than a previously available data rate. In line with the completion of the LTE standardization, more recent studies are focused on LTE-Advanced (LTE-A), which further improves data rate with the adoption of several new techniques to the legacy LTE system. Herein, the term "LTE system" may be construed to include a legacy LTE system and an LTE-A system.

In the legacy LTE system, transmission directions of time and frequency resources are identical among the base stations. That is, if a base station performs downlink transmission using certain time/frequency resource, such that the neighbor base stations use the corresponding time/frequency resource. In this case, the terminal experiences downlink interference caused by downlink signals of the neighbor base stations on the downlink resource and uplink interference caused by uplink signals of the neighbor base stations on the uplink resource. If the adjacent base stations use the resources different in direction, this may further cause different type of interference. Therefore, a base station may experience both the downlink and uplink interferences while a neighbor base station uses certain time/frequency resource for downlink because the legacy system is implemented without consideration of dynamic change in transmission direction of time/frequency resource.

However, the evolved system, i.e., LTE-A, is capable of overcoming the above-described problem and supporting dynamic changes of transmission directions of resources. In the legacy system, in which the downlink transmission of the base station and the uplink transmission of the terminal are performed fixedly, according to a predetermined rule, based on the system information, under an assumption that the transmission direction, once it has been determined, does not change, if the configuration information changes frequently due to the dynamic change in transmission direction, this causes a change in preconfigured downlink transmission timing of the base station and uplink transmission timing of the terminal, thereby resulting in difficulty for data communication.

SUMMARY

The present invention is designed to address at least the problems and/or disadvantages described above and to provide at least the advantages described below.

Accordingly, an aspect of the present invention is to provide a method for supporting transmission/retransmission timings of the base station and the terminal regardless of the change of the configuration information.

In accordance with an aspect of the present disclosure, a signal transmission/reception method of a terminal in a TDD system is provided. The signal transmission/reception method includes receiving, from a base station, first configuration information including an uplink reference Uplink-Downlink (UL-DL) configuration, receiving, from the base station, second configuration information including a downlink reference UL-DL configuration, receiving, from the base station, third configuration information including an equivalent UL-DL configuration based on the first configuration information and the second configuration information, and communicating signals with the base station based on the third configuration information.

In accordance with another aspect of the present disclosure, a signal transmission/reception method of a base station in a TDD system is provided. The signal transmission/reception method includes transmitting, to a terminal, first configuration information including an uplink reference Uplink-Downlink (UL-DL) configuration, transmitting, to the terminal, second configuration information including a downlink reference UL-DL configuration, transmitting, to the terminal, third configuration information including an equivalent UL-DL configuration, based on the first configuration information and the second configuration information, and communicating signals with the terminal based on the third configuration information.

In accordance with another aspect of the present disclosure, a terminal for transmitting/receiving signals in a TDD system is provided. The terminal includes a transceiver that transmits and receives the signals to and from a base station, and a controller that controls the terminal to receive first configuration information including an uplink reference Uplink-Downlink (UL-DL) configuration, second configuration information including a downlink reference UL-DL configuration, and third configuration information including an equivalent UL-DL configuration based on the first configuration information and the second configuration information from the base station, and to communicate signals with the base station based on the third configuration information.

In accordance with another aspect of the present disclosure, a base station for transmitting/receiving signals in a Time Division Duplex (TDD) system is provided. The base station includes a transceiver that transmits and receives signals to and from a terminal, and a controller that controls the base station to transmit, to the terminal, first configuration information including an uplink reference Uplink-Downlink (UL-DL) configuration, second configuration information including a downlink reference UL-DL configuration, and third configuration information including an equivalent UL-DL configuration based on the first configuration information and the second configuration information, and communicate the signals with the terminal based on the third configuration information.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
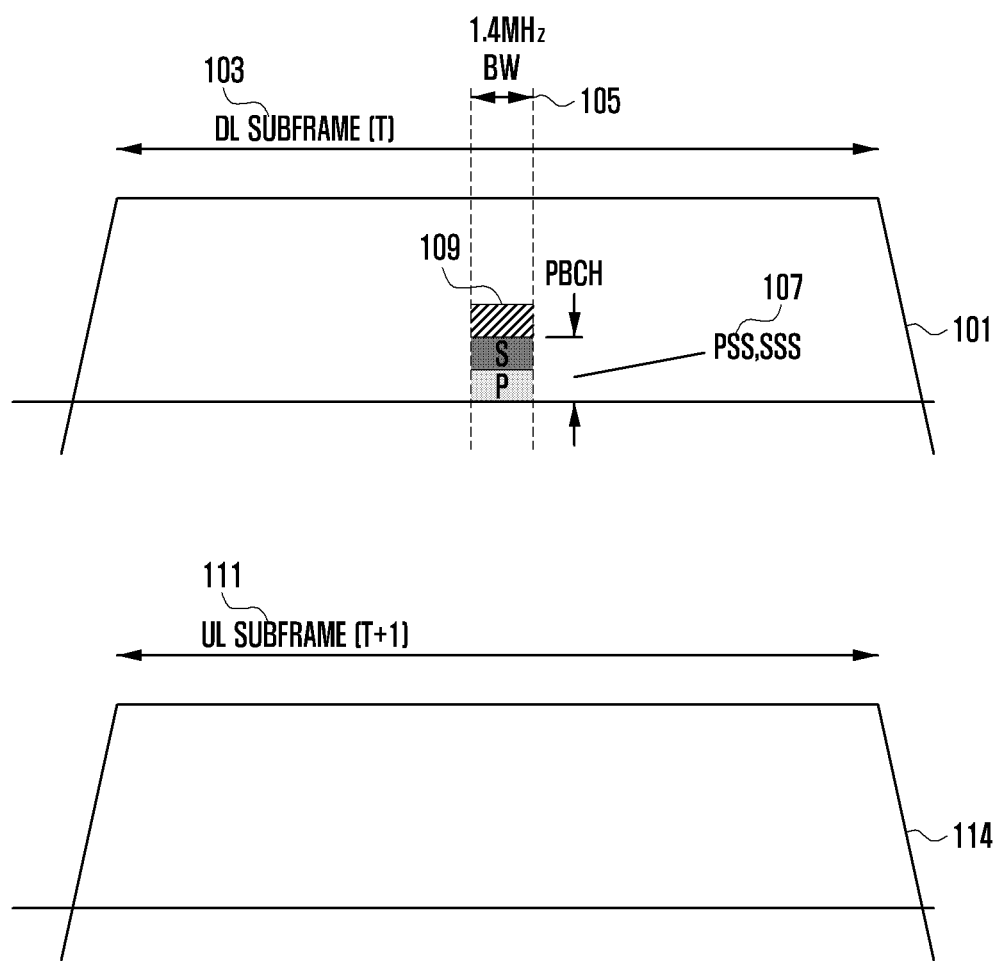
FIG. 1 illustrates a frequency band structure of a TDD system.

Various embodiments of the present invention are described with reference to the accompanying drawings in detail. Detailed description of well-known functions and structures incorporated herein may be omitted to avoid obscuring the subject matter of the present disclosure. For similar reasoning, some of elements may be exaggerated, omitted or simplified in the drawings and the elements may have sizes and/or shapes different from those shown in drawings, in practice. The same reference numbers are used throughout the drawings to refer to the same or like parts.

In accordance with an embodiment of the present invention, configuration information includes uplink and downlink allocation information in association with TDD communication.

An embodiment of the present invention relates to operating a TDD wireless communication system and, in particular, to a signaling method for determining uplink (re)transmission timing and downlink (re)transmission timing, when the TDD system configuration changes dynamically. Accordingly, a method is provided for checking a subframe configuration that is changing dynamically, using second configuration information transmitted in the system information and third configuration information transmitted through the common control channel, determining uplink and uplink (re)transmission timings based on the second configuration information and third configuration information, respectively, and determining whether to abide by the second configuration information or the third configuration information, depending on a Cyclic Redundancy Check (CRC) result of the terminal-specific control channel, to operate subframes changing dynamically.

In accordance with an embodiment of the present invention, a subframe may be switched between uplink and downlink resources dynamically.

In a TDD-based wireless communication system according to an embodiment of the present disclosure, when a base station is synchronized with other base stations using first configuration information, the base station sends the UE second configuration information through the system information or higher layer signaling and sends third configuration information through the common control channel. The uplink transmission/retransmission timing is determined based on the second configuration information and the downlink transmission/retransmission timing is determined based on the third configuration information. The flexible subframe of which direction is indicated differently in the second configuration information and the third configuration information is determined whether to abide by the timing of the second configuration information or the third configuration information, depending on the CRC result of the terminal-specific control channel.

In accordance with an embodiment of the present invention, a method is provided for a base station to send a terminal first configuration information through system information or higher layer signaling, notify the UE of a set of second configuration information and third configuration information through a common control channel, determine uplink transmission/retransmission timing of the terminal based on the second configuration information, determine downlink transmission/retransmission timing of the terminal based on the third configuration information, and determine whether to abide by the timing of the first configuration information or the second configuration information for the flexible subframe of which direction is indicated differently in the second configuration information and third configuration information, depending on a CRC result of the terminal-specific control channel.

In accordance with an embodiment of the present invention, the base station sends a terminal first configuration information through system information or higher layer signaling, sends the terminal second configuration information through a common control channel, and sends the terminal third configuration information through the common control channel. The common control channel carrying the second configuration information and the common control channel carrying the third configuration information are not transmitted in the same subframe. The uplink transmission/retransmission timing of the terminal is determined based on the second configuration information, the downlink transmission/retransmission timing of the terminal is determined based on the third configuration information, and whether to abide by the timing of the second configuration information or the third configuration information for the flexible subframe of which direction is indicated differently in the second configuration information and the third configuration information is determined depending on a CRC result of the terminal-specific control channel.

Before providing the second configuration information and the third configuration information, both the uplink and downlink transmissions are performed based on the first configuration information. However, when the second configuration information is provided but the third configuration information is not, the both the uplink and downlink transmissions are performed based on the second configuration information. The transmitting timings of the second configuration information and the third configuration information are determined by a higher layer to avoid confusion.

In accordance with an embodiment of the present invention, a base station generates a set of second configuration information for uplink operation and third configuration information for downlink operation in advance, and when generating a new configuration information set, makes second configuration information of the new information set equal to the third configuration information of the old configuration information set.

In accordance with an embodiment of the present invention, a terminal receives second configuration information and third configuration information through system information or higher layer signaling, determines uplink transmission/retransmission timing based on the second configuration information, determines the downlink transmission/retransmission timing based on the third configuration information, regards the subframe of which direction is indicated differently in the second configuration information and the third configuration information as a flexible subframe, abides by the timing of the second configuration information for the subframe at which CRC on the control channel for uplink transmission is successful among the terminal-specific control channels in the downlink, based on the second configuration information, attempts receiving downlink control channel and data channel at the flexible subframe when CRC fails on the control channel for uplink transmission among the terminal-specific control channels in the downlink, based on the second configuration information, and abides by the timing of the third configuration information in the downlink, when the reception is successful.

In accordance with an embodiment of the present invention, a terminal receives first configuration information through system information or higher layer signaling, receives a pair of second configuration information and third configuration information through a common control channel, determines uplink transmission/retransmission timing based on the second configuration information, determines downlink transmission/retransmission timing based on the third configuration information, regards a set of subframes of which direction is indicated differently in the second configuration information and the third configuration information as being flexible subframes, abides by the timing of the second configuration information for the subframe at which CRC passes on the control channel for the uplink transmission among the terminal-specific control channels in the downlink, based on the second configuration information, attempts receiving downlink control channel and data channel at the flexible subframe, when CRC fails on the control channel for uplink transmission among the terminal-specific control channels in the downlink, based on the second configuration information, and abides by the timing of the third configuration information in the downlink, when the reception is successful.

In accordance with an embodiment of the present invention, a terminal receives first configuration information through system information or higher layer signaling, receives second configuration information on a common channel at a specific downlink subframe indicated by the first configuration information, and receives third configuration information on the common control channel at a specific downlink subframe indicated by the first configuration information. The terminal does not receive the common control channel carrying the second configuration information and the common control channel carrying the third configuration information at the same subframe. The terminal determines the uplink transmission/retransmission timing based on the second configuration information, determines the downlink transmission/retransmission timing based on the third configuration information, regards a set of subframes of which direction is indicated differently in the second configuration information and the third configuration information as of flexible subframes, abides by the timing of the second configuration information for the subframe at which CRC passes on the control channel for the uplink transmission among the terminal-specific control channels in the downlink, based on the second configuration information, attempts receiving downlink control channel and data channel at the flexible subframe in case that CRC fails on the control channel for uplink transmission among the terminal-specific control channels in the downlink, based on the second configuration information, and abides by the timing of the third configuration information in the downlink, when the reception is successful.

In accordance with an embodiment of the present invention, the term "common control channel" may be used with the same meaning of Downlink Control Information (DCI).

Unlike a Frequency Division Duplex (FDD) system using different frequency bands for downlink and uplink, a TDD system uses the same frequency band for both the downlink and uplink.

FIG. 1 is a diagram illustrating a frequency band structure of a TDD system.

Referring to FIG. 1, reference number 101 denotes a downlink frequency band, and reference number 114 denotes an uplink frequency band. The downlink and uplink subframes 103 and 111 may use the same frequency band. In accordance with an embodiment of the present invention, the downlink and uplink subframes 103 and 111 cannot occur simultaneously, but are separated in time. When the TDD downlink frame operates as denoted by reference number 103, it may carry Physical Broadcast Channel (PBCH) 109 and synchronization signal 107, i.e. Primary Synchronization Signal (PSS) and Secondary Synchronization Signal (SSS), on 1.4 MHZ bandwidth around a center frequency of the downlink subframe 103, as denoted by reference number 105, the synchronization signal being transmitted to the terminal at a time predetermined during the downlink.

In accordance with an embodiment of the present invention, the downlink and uplink traffic amounts differ from each other. That is, the downlink traffic amount may increase at a certain time and the uplink traffic amount may increase at another time, depending on a change in the number of terminals within a cell and traffic amount per terminal.

Because it is typical that the uplink and downlink are equal in bandwidth in an FDD system, the frequency resources are evenly maintained, independently of the uplink and downlink traffic amount, and thus, resource waste may occur temporarily due to unbalance between the uplink and downlink traffic amounts. However, the TDD system may adjust a ratio between the downlink subframe and the uplink subframe on the same frequency band, thereby overcoming the resource waste problem. In a real operation, however, it is difficult to adjust the ratio between the downlink and uplink dynamically.

One reason that it is difficult to dynamically adjust the ratio between downlink and uplink is the interference from the neighbor cells to the valid signal in the corresponding cell. In an FDD system, the downlink signal received by the terminal is influenced by the interference of the downlink signals of the neighbor cells, and the uplink signal transmitted by the terminal is influenced by the interference of the uplink signals of the adjacent terminals. In the downlink, it is possible to predict the maximum interference amount because the fixed base station uses predetermined power, and thus, the corresponding interference may be controlled. In the uplink, it is possible to cancel the interference through uplink power control because the adjacent terminals use a partial bandwidth and the transmit power causing the interference is relatively low. When two adjacent cells operate in different directions (e.g., if a base station 1 operates in an uplink, while a base station 2, which is adjacent to base station 1, operates in a downlink), the transmission power of one cell may interfere with the transmission power of the terminal operating in downlink within the other cell.

Because the transmission power of the base station is over 100 folds higher than that of the terminal, it may be impossible for a base station to receive a signal transmitted by a terminal due to the interference of the signal transmitted by another base station.

For example, when base station 1 operates in a downlink, while a terminal connected to base station 2 operates in an uplink, if a terminal connected to base station 1 is close to the terminal connected to base station 2, the terminal receiving the downlink signal from base station 1 experiences the large transmit power of the terminal connected to base station 2. Due to this interference, it is difficult for the cells to operate in different directions in a coverage area of a macro base station operating at high transmission power level.

Figure 2:
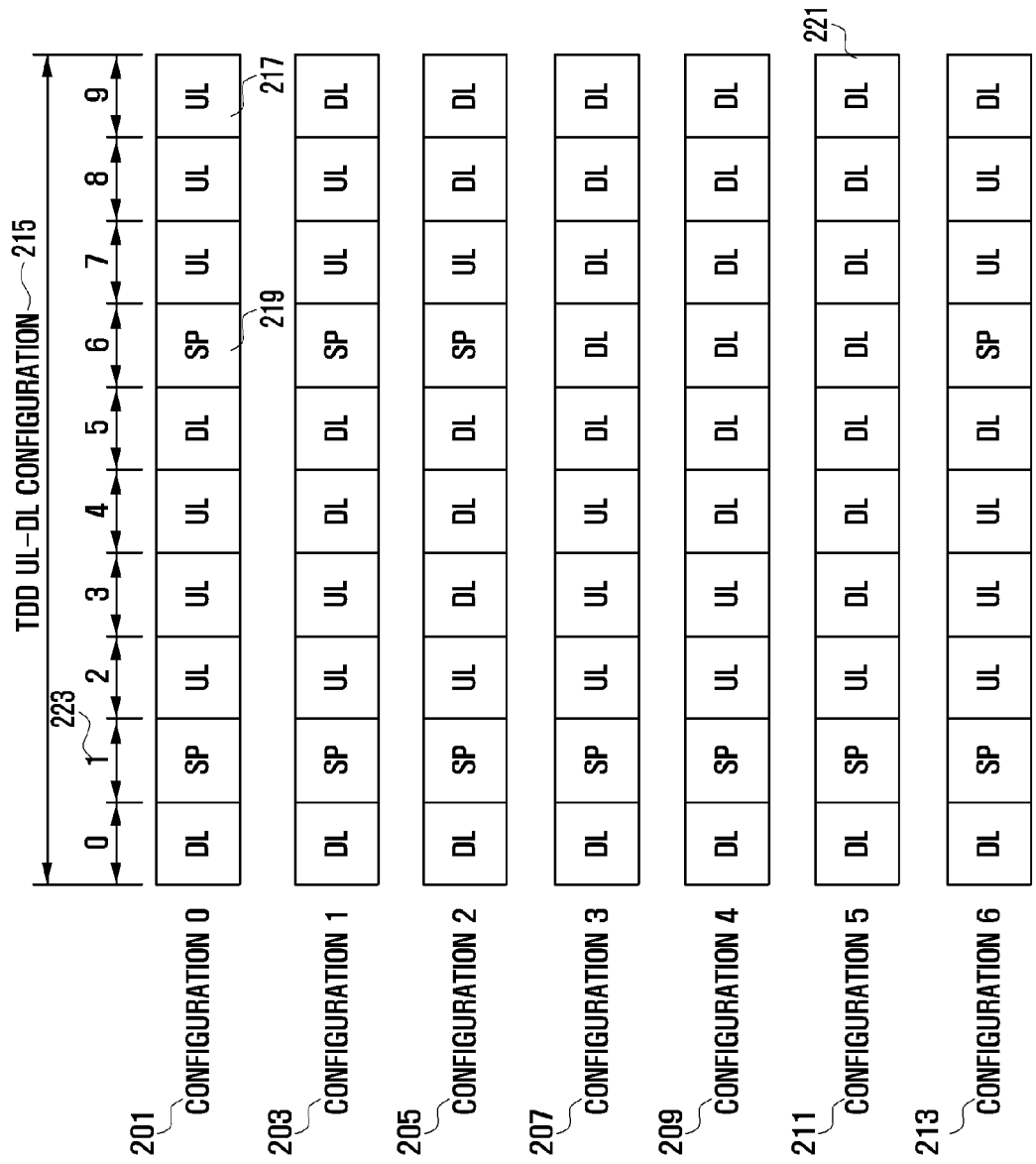
FIG. 2 is a diagram illustrating TDD Uplink-Downlink (UL-DL) configurations for use in an LTE system to which the present invention is applied.

In a communication system supporting both FDD and TDD, such as an LTE system, various TDD configurations are adopted in consideration of long term traffic among the base stations in TDD mode, as illustrated in FIG. 2. Consequently, the uplink and downlink transmission and retransmission timings between the base station and terminal are determined in association of at least one of TDD configurations as illustrated in FIG. 2. When the TDD configuration of a base station changes frequently, the UE may not be able to acquire valid transmission timing, thereby causing system failure.

FIG. 2 is a diagram illustrating TDD UL-DL configurations for use in an LTE system to which the present invention is applied. Specifically, FIG. 2 illustrates radio frame configurations available in a TDD system.

Referring to FIG. 2, reference number 215 denotes a radio frame including 10 subframes 223, and the radio frame may be structured with one of 7 TDD UL-DL configurations 0-6 as denoted by reference numbers 201 to 213. Each configuration includes downlink and uplink time periods in different numbers.

For example, configuration 0 201 includes total 6 uplink subframes, i.e., subframe#2, subframe#3, subframe#4, subframe#7, subframe#8, and subframe#9, as denoted by reference number 217. The configuration 0 201 also includes total two downlink subframes, i.e., subframe#0 and subframe#5, as denoted by reference number 221. The configuration 0 201 also includes two special (SP) subframes, i.e., subframe#1 and subframe#6, as denoted by reference number 219, and each special subframe includes a downlink part and an uplink part. A guard period is provided between the downlink and uplink parts to protect against downlink/uplink interference. The special subframe is provided for switching from downlink to uplink, and the downlink part may be used for data channel transmission, while the uplink part may be used for the preamble transmission for initial attach or channel estimation.

The configuration 5 211 includes a largest number of downlink subframes, i.e., subframe#0, subframe#3, subframe#4, subframe#5, subframe#6, subframe#7, subframe#8, and subframe#9, as denoted by reference number 221. The subframe#1 is used as special subframe. A TDD radio frame configuration is selected based on the long traffic influence, and the selected TDD radio frame configuration is used by all the predetermined base stations.

Currently, if the configuration should be changed, due to the change of traffic environment, the entire system stops operation and resumes after the radio frame configuration is updated in all of the cells, such that all of the terminals have to perform the access procedure again. Such a configuration switching procedure is inefficient and almost impossible to perform. When stopping the operation of the entire communication system to change the radio frame configuration and resuming the operation of the system after radio frame configuration change, the time required to adapt to the changed configuration may be different for each terminal, and changing the configuration when the system is running is likely to cause various unfavorable side effects.

Figure 3:
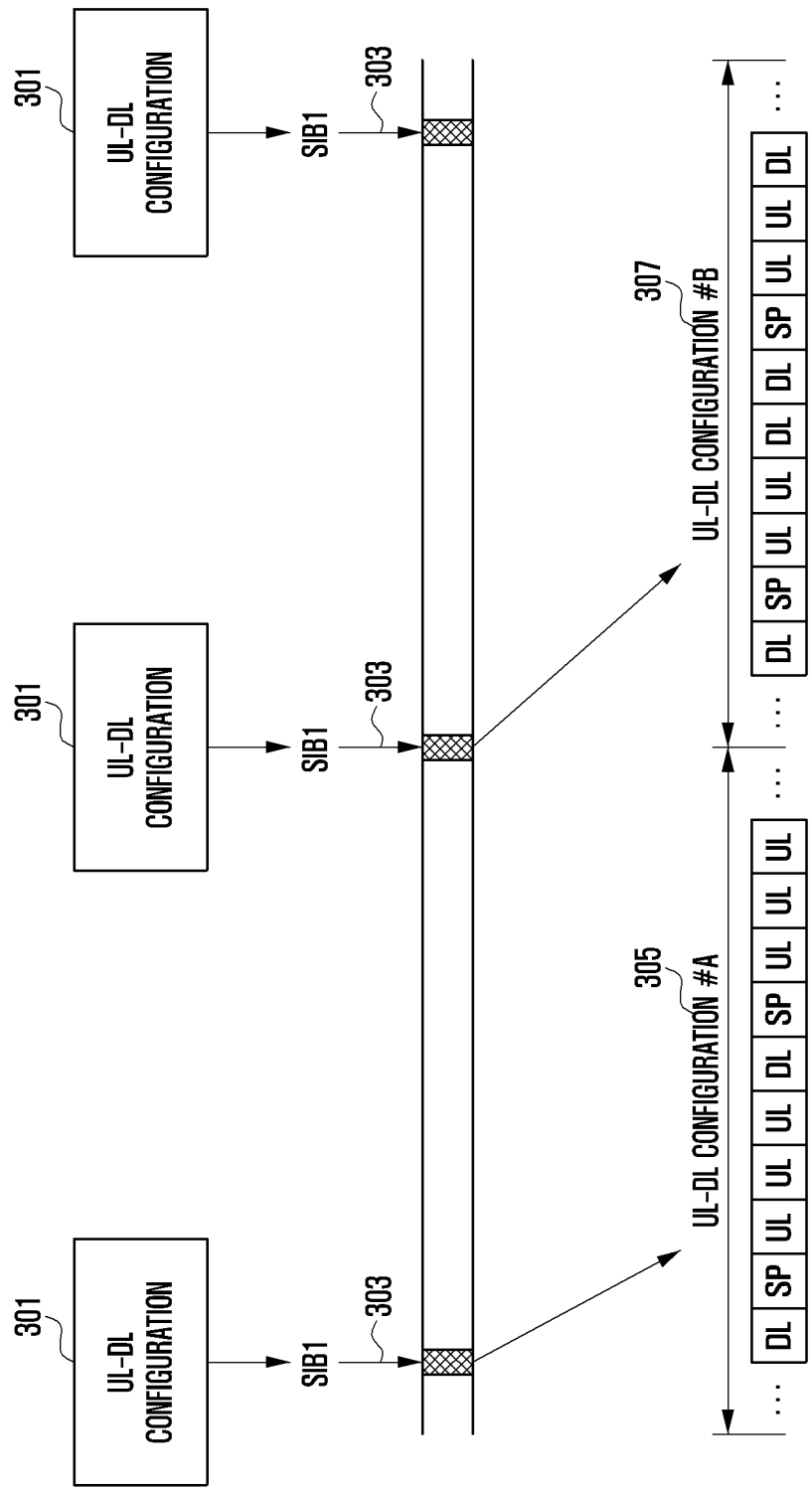
FIG. 3 is a diagram illustrating a transmission of system information in an LTE system to which the present invention is applied.

FIG. 3 is a diagram illustrating an operation of updating configuration information and notifying a UE of updated configuration information using system information according to an embodiment of the present invention.

Referring to FIG. 3, TDD configuration information 301 is generated by a current base station. The TDD configuration information 301 is transmitted to a terminal in the system information, e.g., System Information Block 1 (SIB1) 303.

The terminal may detect any change in the system information and, if the system information includes TDD UL-DL configuration #A 305, determines its uplink and downlink transmission timings based on the TDD UL-DL configuration #A 305.

The terminal monitors the system information to detect an update, and if an update is detected, checks the TDD UL-DL configuration #B 307 as the update in the system information and determines its uplink and downlink transmission timings, based on the TDD UL-DL configuration #B 307. When the TDD UL-DL configuration #B 307 is received while the terminal performs transmission based on the TDD UL-DL configuration #A 305, the terminal is aware of the change in TDD UL-DL configuration after the base station changes the TDD UL-DL configuration, and thus, it may not transmit/receive data any more due to the ambiguity on the transmission timings during the change between TDD UL-DL configuration #A and TDD UL-DL configuration #B.

In this situation, it may become possible for the terminal to transmit/receive data after a certain time has elapsed since the change of TDD UL-DL configuration, which likely degrades system throughput in the system in which the resource amount is dynamically changed. Therefore, there is a need for a method of changing TDD UL-DL configuration without breaking data communication.

Figure 4:
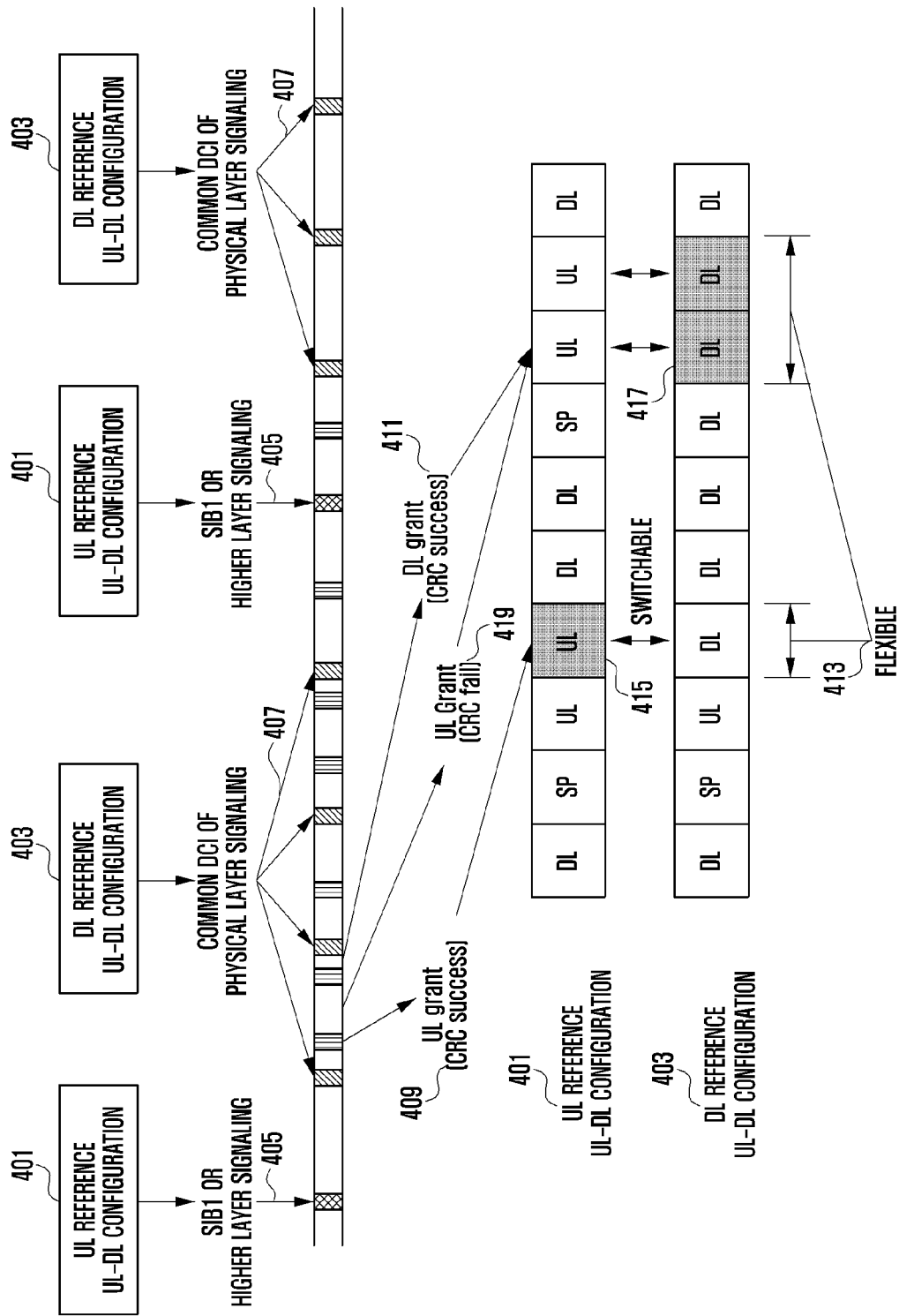
FIG. 4 illustrates a dynamic TDD system operation method according to an embodiment of the present invention.

FIG. 4 illustrates a dynamic TDD system operation method according to an embodiment of the present invention.

In FIG. 4, a base station transmits second configuration information for uplink transmission timing to the a using system information or higher layer signaling and transmits third configuration information as reference configuration information for downlink transmission timing to the terminal using a common control channel. A terminal checks a dynamic sub frame set by comparing the second configuration information and the third configuration information and determines whether to abide by the timing indicated by the second configuration information or the timing indicated by the third configuration information based on whether a terminal-specific control channel is received or not.

Referring to FIG. 4, the base station is synchronized with neighbor base stations using the first configuration information, and all terminals within the corresponding cell may connect to the system using the first configuration information with priority.

The base station may send the terminal the second configuration information 401 for dynamic TDD operation. In accordance with an embodiment of the present invention, the base station may transmit the second configuration information 401 to the terminal through the system information (e.g., SIB 1) or higher layer signaling 405. Depending on the embodiment, the first configuration information and the second configuration information 401 may be identical or different from each other.

The base station may send the terminal the third configuration information 403 through the common control channel 407. Here, the second configuration information 401 may be identical with the first configuration information. The uplink transmission/retransmission timing of the terminal, which has received the third configuration information 403, may be determined based on the second configuration information 401, and the downlink transmission/retransmission timing of the terminal may be determined based on the third configuration information 403.

If the subframe is indicated differently in transmission direction in the second configuration information 401 and the third configuration information 403, as denoted by reference number 413, such a subframe may be referred to as a flexible subframe. The flexible subframe includes a set of the subframe indicated differently in transmission direction in the second configuration information 401 and the third configuration information 403, as denoted by reference number 413.

When the flexible subframe, of which transmission direction is indicated differently in the second configuration information 401 and the third configuration information 403, the terminal determines whether to abide by the timing of the second configuration information 401 or the timing of the third configuration information 403, depending on whether terminal-specific control channel is received or whether a CRC has passed. If the CRC passed on the control channel for uplink transmission among the terminal-specific control channel in the downlink, based on the second configuration information 401 at the corresponding subframe 415, the terminal operates using the timing of the second configuration information 401 at the corresponding subframe. However, if the CRC failed on the control channel for the uplink transmission among the terminal-specific control channels in the downlink, based on the second configuration information 401, the terminal attempts receiving downlink control channel and data channel at the flexible subframe 417. If the reception is successful at the flexible subframe 417, as denoted by reference number 411, the terminal operates using the downlink timing of the third configuration information 403.

In FIG. 4, the method of transmitting the second configuration information 401 using the system information or higher layer signaling uses at least one of an SIB, an RRC message, and a Media Access Control (MAC) control element. The uplink transmission timing at the subframe, which is not flexible subframe 413, is determined based on the second configuration information 401, but the uplink transmission timing at the flexible subframe 413 is determined based on the third configuration information 403. Here, the uplink transmission at the flexible subframe 413 is indicated when the flexible subframe 413 is used for the downlink, and the downlink control channel of the corresponding subframe includes CSI report request. In this case, the terminal transmits the CSI measured when the flexible subframe is used for downlink according to the ACK/NACK transmission timing determined based on the third configuration information 403 because the second configuration information 401 indicating the uplink transmission has no uplink timing at the corresponding subframe used for the downlink, when the flexible subframe is used for downlink.

TABLE 1

| Set 2 | ($2^{nd}$ configuration, $3^{rd}$ configuration) | Set 1 | # | Ref |
|---|---|---|---|---|
| (0, 1), (0, 2), (0, 3), (0, 4), (0, 5) | (0, 0) | | 6 | 0 |
| | (1, 1) | (1, 2), (1, 4), (1, 5) | 4 | 1 |
| (2, 1) | (2, 2) | (2, 5) | 3 | 2 |
| (3, 2), (3, 1) | (3, 3) | (3, 4), (3, 5) | 5 | 3 |
| (4, 3), (4, 2), (4, 1) | (4, 4) | (4, 5,) | 5 | 4 |
| (5, 4), (5, 3), (5, 2), (5, 1) | (5, 5) | | 5 | 5 |
| (6, 1), (6, 2), (6, 3), (6, 4), (6, 5) | (6, 6) | | 6 | 6 |

In Table 1, (A, B) = (First UL-DL configuration, Second UL-DL configuration).

Table 1 shows examples of the combinations of second configuration information and third configuration information available in a system. In table 1, the configuration combination is expressed as ($2^{nd}$ configuration, $3^{rd}$ configuration), and there are first and second sets. The first set maintains a UL subset while guaranteeing RTT of 10 msec based on the total 7 reference configurations supported in LTE.

Using the first set, data scheduling is possible at all of the subframes indicated by the second configuration information and the third configuration information.

The second set neither guarantees the RTT of 10 msec nor maintains the UE subset, and thus, it is not always possible to schedule data at all the subframes indicated by the second configuration information and the third configuration information.

In accordance with an embodiment of the present invention, the base station notifies of the second configuration information and the third configuration information using the combinations as shown in table 1 to improve resource utilization efficiency. However, the present invention is not limited to the use of the configurations sets listed in table 1, and may utilize other configurations sets.

According to an embodiment of the present invention, the base station allocates enough uplink resource based on the second configuration information and a relatively low speed by the second configuration, and may change the transmission direction from uplink indicated by the second configuration information to downlink through common control channel and adjust uplink and downlink resource amounts dynamically based on the terminal scheduling information without significant increase of configuration information change overhead.

According to an embodiment of the present invention, the terminal transmits CSI measurement to an evolved NodeB (eNB) when a neighbor cell operates in an uplink, if the neighbor cell uses a flexible subframe for uplink transmission.

Figure 5:
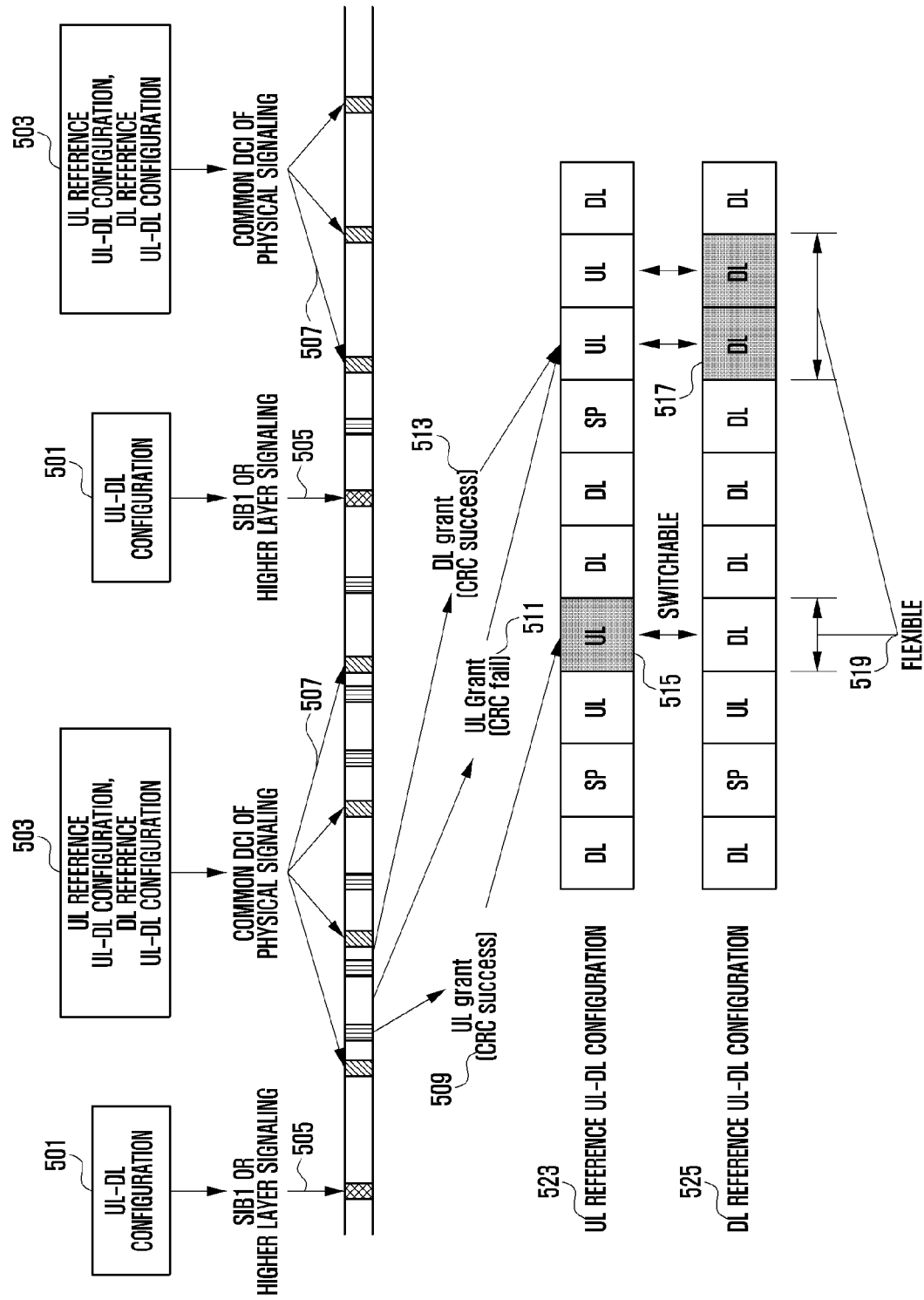
FIG. 5 illustrates a dynamic TDD system operation method according to another embodiment of the present invention.

FIG. 5 illustrates a dynamic TDD system operation method according to another embodiment of the present invention.

In FIG. 5, a base station simultaneously sends a terminal second configuration information for uplink transmission timing and third configuration information as reference configuration information for a downlink transmission timing through a common control channel. The terminal checks a dynamic subframe set by comparing the received second configuration information and third configuration information. According to an embodiment of the present invention, the terminal may determine whether to operate using the timing indicated by the second configuration information or the timing indicated by the third configuration information at the corresponding subframe, based on whether a terminal-specific control channel is received successfully.

In accordance with an embodiment of the present invention, the second configuration information also can be changed dynamically and transmitted through the common control channel, such that all of the terminals with a cell can select the uplink timing to operate using, without determination ambiguity.

In accordance with an embodiment of the present invention, if UL-DL configuration information is transmitted through higher layer signaling, the terminals within the cell are likely to be aware of a change to the UL-DL configuration at different times, which may cause operation ambiguity. When transmitting the UL-DL configuration through the common control channel, however, the terminals within the cell are simultaneously aware of the change of UL-DL configuration, overcoming such a problem.

Referring to FIG. 5, the base station is synchronized with neighbor base stations based on the first configuration information 501. All of the terminals within the cell of the base station may communicate with the base station based on the first configuration information with priority. More specifically, the terminals receive system information 505 including the first configuration information and communicate signals with the base station based on the first configuration information.

The base station sends the terminals the second configuration information and third configuration information 503 through the common control channel 507 for dynamic TDD operation. The second configuration information and third configuration information 503 may be transmitted to the terminal simultaneously.

According to an embodiment of the present invention, the base station may send the terminal the second configuration information identical with or different from the first configuration information 501. Upon receipt of the second configuration information and the third configuration information, the terminal operates using the uplink transmission/retransmission timing based on the second configuration information and the downlink transmission/retransmission timing based on the third configuration information 503.

When the transmission direction of a subframe is indicated differently in the second configuration information and the third configuration information 503, as denoted by reference number 515, the terminal identifies the corresponding subframe as a flexible subframe 519.

When the flexible subframe 519, of which transmission direction is different in the second configuration information and the third configuration information 523 and 525, the terminal determines whether to operate using the timing of the second configuration 523 or the timing of the third configuration 525, depending on whether a terminal-specific control channel has been received or whether the CRC has passed.

If the CRC has passed on the control channel for uplink transmission among the terminal-specific control channels in the downlink, based on the second configuration information at the corresponding subframe 515, the terminal operates using the timing of the second configuration information 523 at the corresponding subframe. Otherwise, if the CRC fails, as denoted by reference number 511, on the control channel for uplink transmission among the terminal-specific control channels in downlink 517, based on the second configuration information 523, the terminal attempts receiving downlink control and data channels at the flexible subframe 517, and if the reception is successful, operates using the timing of the third configuration information 525 for the downlink.

In FIG. 5, although the terminal operates using the timing of the second configuration information 523 for uplink transmission at the subframe, which is not flexible subframe, when the signal is received, based on the UL-DL configuration, the terminal may operate using the timing of the third configuration information 525 for uplink transmission at the flexible subframe. Here, the uplink transmission at the flexible subframe is indicated when the flexible subframe 517 is used for downlink and the downlink control channel of the corresponding subframe include CSI report request, and in this case, the terminal may transmit the measured CSI when the flexible subframe is used for the downlink. At this time, the terminal operates in accordance with the ACK/NACK transmission timing, which is determined based on the third configuration information 525 for transmitting CSI, because the second configuration information 523 indicating uplink transmission has no uplink timing at the corresponding subframe, when the flexible subframe is used for the downlink.

In accordance with an embodiment of the present invention, the combination of the second configuration information and the third configuration information to be transmitted through a common control channel may be any of the combinations shown in Table 2, below. In Table 2, the configuration combination is expressed as ($2^{nd}$ configuration, $3^{rd}$ configuration), and there are first and second sets. The first set maintains a UL subset, while guaranteeing an RTT of 10 msec, based on the total 7 reference configurations supported in LTE.

Using the first set, it is possible to schedule data at all subframes indicated by the second configuration information and the third configuration information.

The second set includes configurations, which neither guarantee the RTT of 10 msec nor maintain the UL subset such that scheduling may not be possible at all subframes indicated by the second configuration information and third configuration information.

In accordance with an embodiment of the present disclosure, the base station determines the combination of the second configuration information and third configuration information, based on Table 1 or Table 2. In this case, it is possible to improve resource utilization efficiency without restriction to use of any set.

Figure 6:
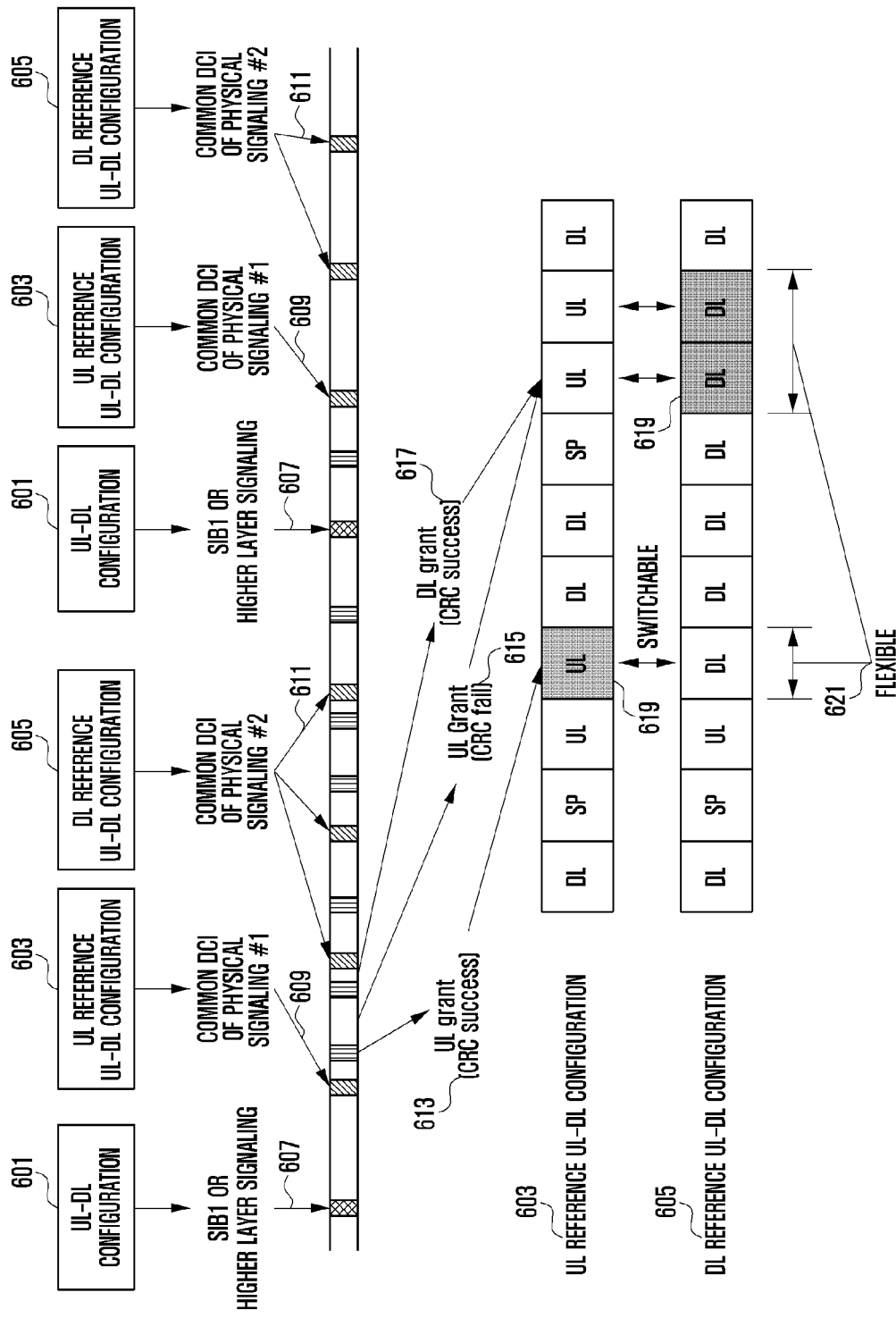
FIG. 6 illustrates a dynamic TDD system operation method according to another embodiment of the present invention.

FIG. 6 illustrates a dynamic TDD system operation method according to another embodiment of the present disclosure.

In FIG. 6, the base station may send the terminal the second configuration information for uplink transmission timing and the third configuration information as the reference configuration information for downlink transmission timing through a common control channel. The terminal may check a dynamic subframe set by comparing the second configuration information and the third configuration information and determine whether to operate using the timing indicated in the second configuration information or the timing indicated in the third configuration information at the corresponding subframe, depending on whether a terminal-specific control channel is received.

In accordance with an embodiment of the invention, the second configuration information and the third configuration information may be transmitted through the common control channel at different subframes.

In accordance with an embodiment of the present invention, the subframes carrying the second configuration information and third configuration information are determined according to a predetermined rule or in such a way of notifying the terminal of subframe candidates through higher layer signaling. Although the third configuration information may be transmitted at an interval shorter than that of the second configuration information, the transmission intervals may vary.

In accordance with an embodiment of the invention, it is possible to dynamically change the second configuration information for an uplink transmission and the third configuration information for a downlink transmission, and the base station may transmit the configuration information to the terminals within the cell through the common control channel, such that the terminal can determine the uplink and downlink timings to use, without ambiguity. Because it is often preferred to transmit the second configuration information to the terminal at relatively short intervals, if the second configuration information is transmitted at a separate interval, it is possible to expect additional signaling overhead reduction.

Referring to FIG. 6, the base station may be synchronized with neighbor base stations forming cells using the first configuration information 601. The terminals within the corresponding cell may communicate with the base station based on the first configuration information which is received through the system information 607.

The base station may transmit at least one of the second configuration information and the third configuration information to the terminals within the cell through the common control channel 609. For example, the base station may use second configuration information 603, which is identical to the first configuration information 601 in UL-DL configuration, and the transmission interval of the second configuration information 603 may be set to a value longer than the transmission interval of the third configuration information 605.

If the signal transmitted by the base station is received, the terminal may operate using the uplink transmission/retransmission timing of the second configuration information 603 and the downlink transmission/retransmission timing of the third configuration information 605.

In accordance with an embodiment of the present invention, if the direction of a subframe is different between the second configuration information 603 and third configuration information 605, the terminal may regard the corresponding subframe as a flexible subframe 621.

In accordance with an embodiment of the present invention, the terminal may determine whether to operate using the timing of the second configuration information 603 or the timing of the third configuration information 605 depending on whether the dedicated control channel has been transmitted or whether CRC has passed, at the flexible subframe 621 of which direction is directed differently in the second configuration information 603 and the third configuration information 605.

If CRC has passed, as denoted by reference number 613, on the control channel for uplink transmission among the dedicated control channels in the downlink, based on the second configuration information 603 at the corresponding subframe 619, the terminal may operate using the timing of the second configuration information 603 at the corresponding subframe. If CRC has failed on the control channel for uplink transmission among the dedicated control channel in the downlink, based on the second configuration information 603, the terminal may attempt receiving downlink control and data channels at the flexible subframe 619. If reception is successful, as denoted by reference number 617, the terminal may operate using the timing of the third configuration information 605 for the downlink.

Although the terminal operates using the second configuration information 603 for uplink transmission timing at the subframe, which is not flexible subframe, the terminal may operate using the third configuration information 605 for an uplink transmission at the flexible subframe 621. Here, the uplink transmission at the flexible subframe 621 is indicated when the flexible subframe 621 is used for downlink and the downlink control channel of the corresponding subframe includes CSI report request. In this case, the terminal may transmit the measured CSI when the flexible subframe is used for the downlink, and at this time, operate using the ACK/NACK transmission timing determined based on the third configuration information 605 for transmitting CSI, because the second configuration information 603 indicating uplink transmission has no uplink timing at the corresponding subframe used for the downlink, when the flexible subframe is used for downlink.

In FIG. 6, the second configuration information 603 and the third configuration information 605 transmitted through the common control channels 609 and 611 may include at least one of the configurations shown in Table 2 below. For example, the first common control channel 609 includes the second configuration information 603 and corresponds to 'common 1' in Table 2.

The second common control channel 611 may be construed as a combination of the second configuration information and the third configuration information determined as 'common 2'. Such a combination is expressed as ($2^{nd}$ configuration, $3^{rd}$ configuration) and there are first and second sets, as shown in Table 1.

The first set maintains a UL subset while guaranteeing an RTT of 10 msec, based on the total 7 reference configurations supported in LTE. Using the first set, data scheduling is possible at all of the subframes indicated by the second configuration information and the third configuration information.

The second set neither guarantees the RTT of 10 msec nor maintains the UE subset, and thus, it is not always possible to schedule data at all the subframes indicated by the second configuration information and the third configuration information.

In accordance with an embodiment of the present invention, the base station notifies of the second configuration information and the third configuration information using the combinations as shown in Table 1 or Table 2. In this case, it is possible to improve resource utilization efficiency, but the present invention may also be embodied with other configurations sets than those of Tables 1 and 2.

TABLE 2

| Common1 | Common 2 | | | | | | | |
|---|---|---|---|---|---|---|---|---|
| | 0 | 1 | 2 | 3 | 4 | 5 | 6 | 7 |
| 0 | (0.0) | (0.1) | (0.2) | (0.3) | (0.4) | (0.5) | Reserved | Reserved |
| 1 | (1.1) | (1.2) | (1.4) | (1.5) | Reserved | Reserved | Reserved | Reserved |
| 2 | (2.2) | (2.1) | (2.5) | Reserved | Reserved | Reserved | Reserved | Reserved |
| 3 | (3.3) | (3.4) | (3.5) | (3.1) | (3.2) | Reserved | Reserved | Reserved |
| 4 | (4.4) | (4.5) | (4.1) | (4.2) | (4.3) | Reserved | Reserved | Reserved |
| 5 | (5.5) | (5.1) | (5.2) | (5.3) | (5.4) | Reserved | Reserved | Reserved |
| 6 | (6.6) | (6.1) | (6.2) | (6.3) | (6.4) | (6.5) | Reserved | Reserved |

Figure 7:
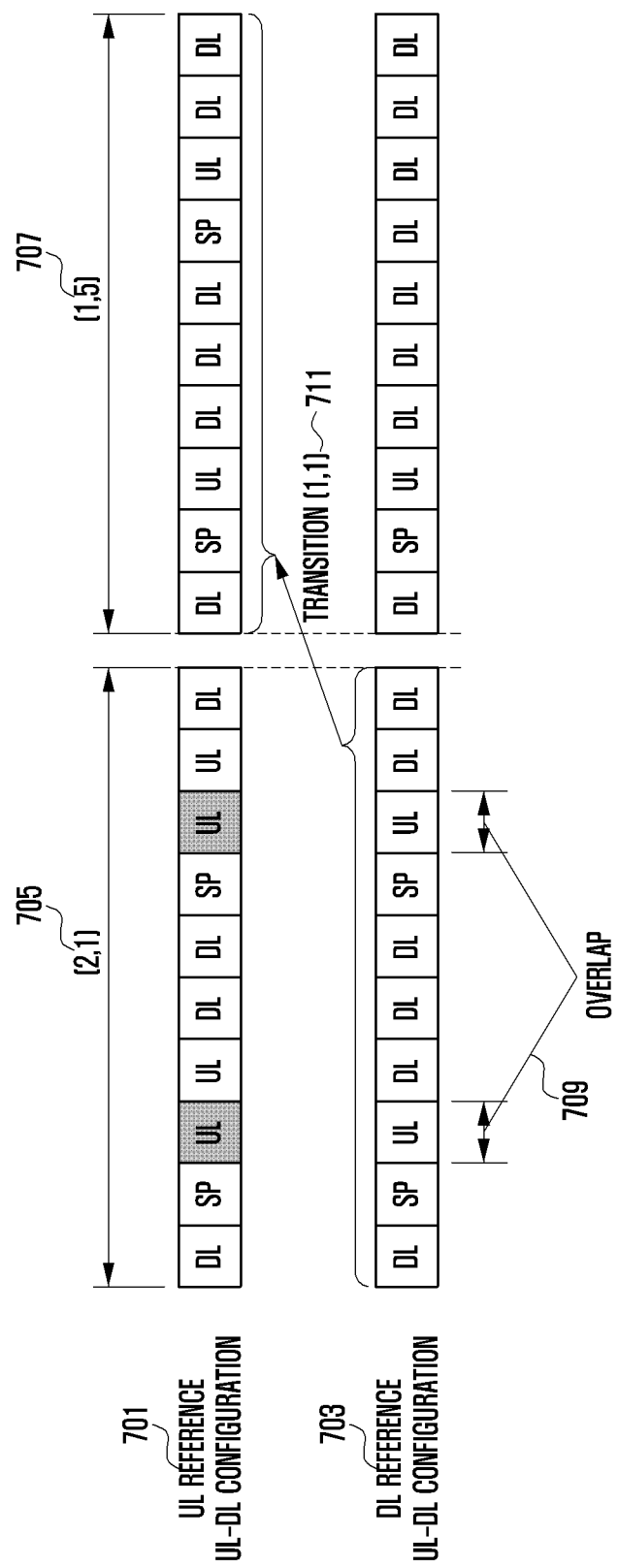
FIG. 7 illustrates a method of instructing change of a set of restricted second and third configurations according to an embodiment of the present invention.

FIG. 7 illustrates a method of instructing a change of a set of restricted second configuration information and third configuration information according to an embodiment of the present invention.

Referring to FIG. 7, using a set of the second configuration information 701 and the third configuration information 703, the terminal is capable of dynamically changing the second configuration information for uplink transmission without breaking the uplink transmission.

When changing the combination of the second configuration information and the third configuration information, which the base station has informed from (2, 1), as denoted by reference number 705, to (1, 5), as denoted by reference number 707, this may cause confusion during the change of the second configuration information from 2 to 1 because the terminal undergoes ambiguity of determining the subframe available for use, due to change of the third configuration for downlink.

In this case, the base station changes the combination from (2, 1) to (1, 1) intermediately, as denoted by reference number 711, by taking notice of the current configuration combination, to prevent the change in the uplink from influencing to the downlink resource, and then changes the combination from (1, 1) to (1, 5), as denoted by reference number 707, thereby preventing the terminal from undergoing ambiguity on the flexible subframe. That is, the base station may change the UL-DL configuration combination to another combination through an intermediate UL-DL configuration combination to facilitate data communication during the change. In this way, it is possible to seamlessly continue uplink and downlink transmissions.

Figure 8:
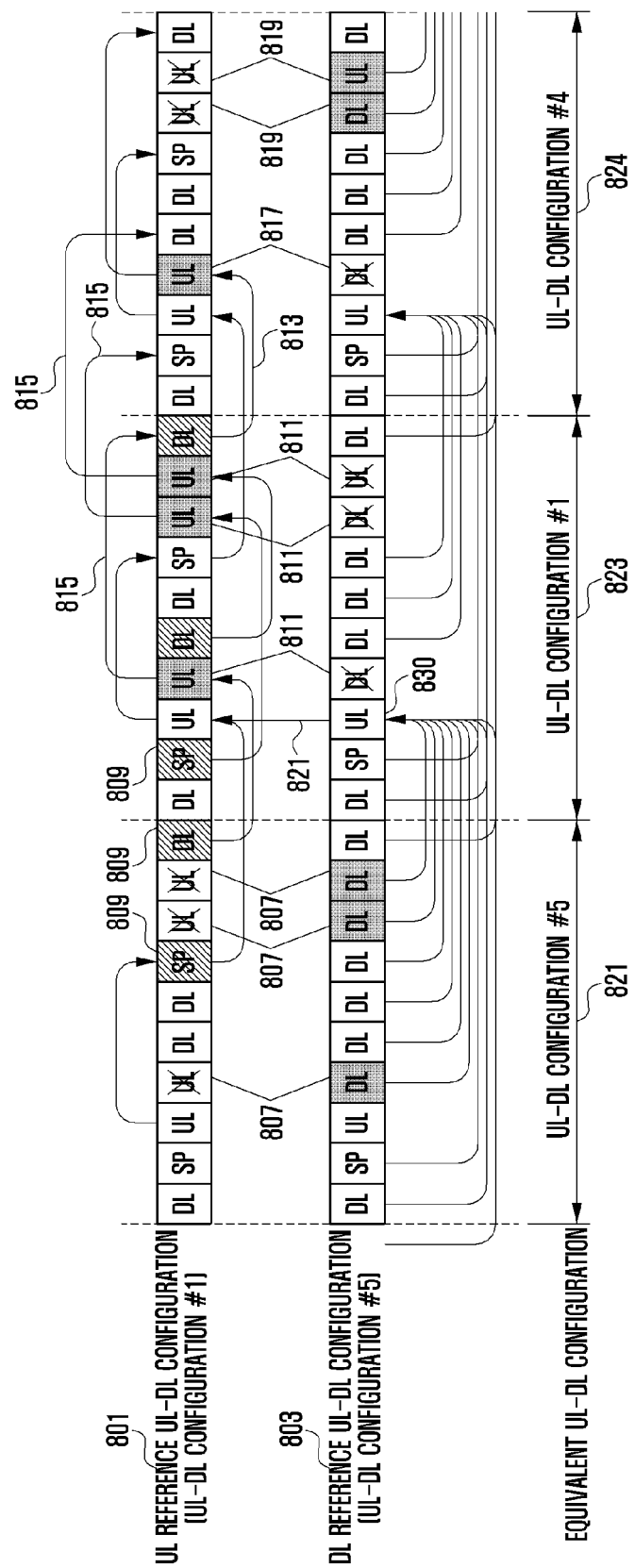
FIG. 8 illustrates an uplink downlink timing determination operation based on second and third configurations according to an embodiment of the present invention.

FIG. 8 illustrates an uplink downlink timing determination operation based on second configuration information and third configuration information according to an embodiment of the present invention. Specifically, FIG. 8 illustrates uplink and downlink transmission/retransmission operations based on the second configuration information and the third configuration information, and the change of timings when there is a CSI request.

Referring to FIG. 8, the base station sends the terminal the second configuration information indicating the configuration #1 203 of FIG. 2 and the second configuration information indicating the configuration #5 211 of FIG. 2, as denoted by reference numbers 801 and 803, respectively. In this case, the terminal may operate in accordance with the second configuration information 801 for the uplink transmission/retransmission, i.e., the uplink control channel for uplink data channel transmission and uplink data channel, and for the transmission timing of the acknowledge channel corresponding to the uplink data channel transmitted from the base station to the terminal. The terminal may operate in accordance with the third configuration information 803 informed by an eNB for the downlink transmission/retransmission, i.e., downlink control channel for downlink data channel transmission and the downlink data channel, and for the transmission timing of the acknowledgement channel from the terminal to the base station. When receiving the second configuration information 801 and the third configuration information 803 for use in recognizing a set of flexible subframes, the terminal compares positions of the corresponding subframes and regards the subframe of which direction is indicated differently in the second configuration information and the third configuration information as the flexible subframe. Accordingly, when the transmission at the subframe, which is not flexible subframe, the terminal operates using the second configuration information for the uplink and the third configuration information for the downlink. For the flexible subframe 817, the terminal may selectively use the subframe for the downlink and uplink, and in order to achieve this, a terminal-specific control channel is used.

When the subframe 807 is used for the downlink, the base station sends the terminal the downlink control channel at the subframe 807, and the terminal sends the base station the acknowledge channel corresponding to the downlink transmission as an uplink control channel at the timing 830, based on the third configuration information.

When the terminal uses the flexible subframe 811 for the uplink, the base station transmits uplink scheduling control channel in downlink 809 corresponding to the uplink control channel transmission timing of the corresponding subframe, based on the second configuration information, and if it is received, the terminal transmits uplink data channel at the subframe 811, based on the timing defined in the second configuration information, the subframe not being used for downlink control channel transmission. If retransmission is necessary due to the occurrence of a NACK corresponding to the data channel transmitted at the flexible subframe for uplink, the corresponding flexible subframe is used for uplink, as denoted by reference number 817, by instructing retransmission using the second configuration information as denoted by reference number 813.

However, if an ACK occurs, there is no need of retransmission request, as denoted by reference number 815, and thus, the base station may perform downlink transmission at the flexible subframe 819.

A CSI request may occur at a flexible subframe or non-flexible subframe. If the CSI request occurs at the flexible subframe, the UE may perform CSI feedback under the assumption that the flexible subframe is used for downlink. Otherwise, the UE may perform CSI feedback at a downlink subframe other than the flexible subframe.

The CSI feedback is transmitted through uplink data channel. Because the flexible subframe is an uplink subframe, based on the second configuration information for the terminal using the uplink data channel based on the second configuration information, if the corresponding subframe is used for downlink, no timing is available for transmission.

When a CSI request is transmitted at the flexible subframe, the terminal may transmit the corresponding information through the uplink data channel in consideration of the uplink acknowledgement channel timing 821 corresponding to the downlink transmission based on the third configuration information. In accordance with an embodiment of the present invention, the terminal may communicate signals with the base station according to an Equivalent UL-DL configuration, which is determined based on the information received from the base station.

When the CSI request occurs at a downlink subframe other than a flexible subframe, as denoted by reference number 823, the terminal performs feedback to the base station through the uplink data channel at the timing of the second configuration information. Although the configurations 801 and 803 have 4 and 1 uplink subframes, respectively, there is only one subframe actually used for uplink and 2 flexible subframes. Such a change is made because the UL-DL configuration change information is transmitted through a terminal specific-control channel, and in this embodiment, the base station may determine the weights of the second configuration information and the third configuration information. The base station also may determine the maximum and minimum values of the second configuration information and the third configuration information and change them dynamically. In this way, the base station is capable of accurately changing the UL-DL configuration in adaptation to the variation of the traffic condition on a terminal-specific control channel.

Figure 9:
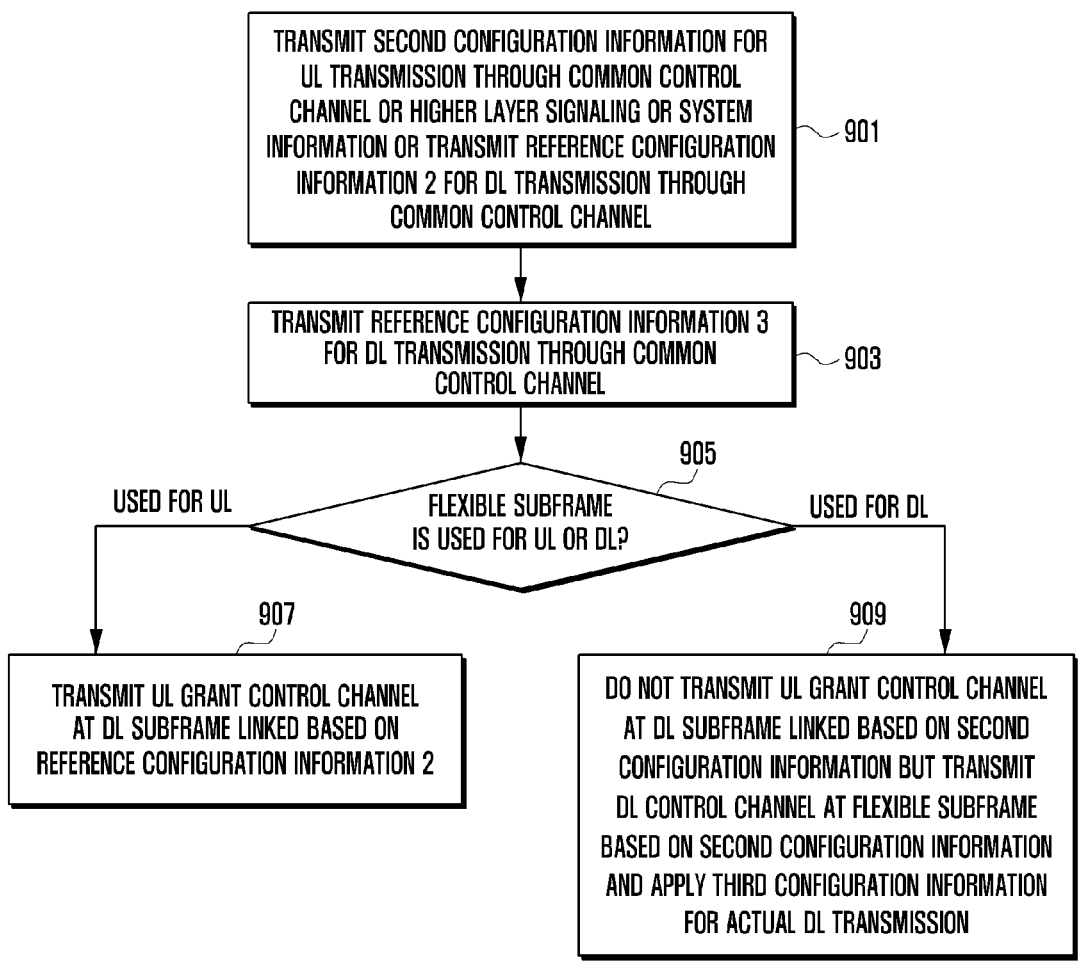
FIG. 9 is a flowchart illustrating an interference control procedure of a base station according to an embodiment of the present invention.

FIG. 9 is a flowchart illustrating an interference control procedure of a base station according to an embodiment of the present invention.

Referring to FIG. 9, the base station proposes the second configuration information for the uplink data channel transmission retransmission timings through higher layer signaling in step 901. The second configuration information may be transmitted through higher layer signaling, system information, or terminal-specific control channel depending on the embodiment.

In step 903, the base station sends the terminal the third configuration information for downlink data channel transmission and retransmission timings through the common control channel.

In step 905, the base station determines whether the flexible subframe is used for the uplink.

If the flexible subframe is used for the uplink, the base station sends the uplink grant control channel at the downlink subframe based on the reference configuration information 2 in step 907.

However, if the flexible subframe is used for the downlink, the base station transmits a downlink control channel at a flexible subframe, based on the second configuration information, other than transmitting uplink grant control channel at the downlink subframe based on the second configuration information, and operates using the timings of the second configuration information in step 909.

This base station operation is applicable commonly to the above-described embodiments.

Figure 10:
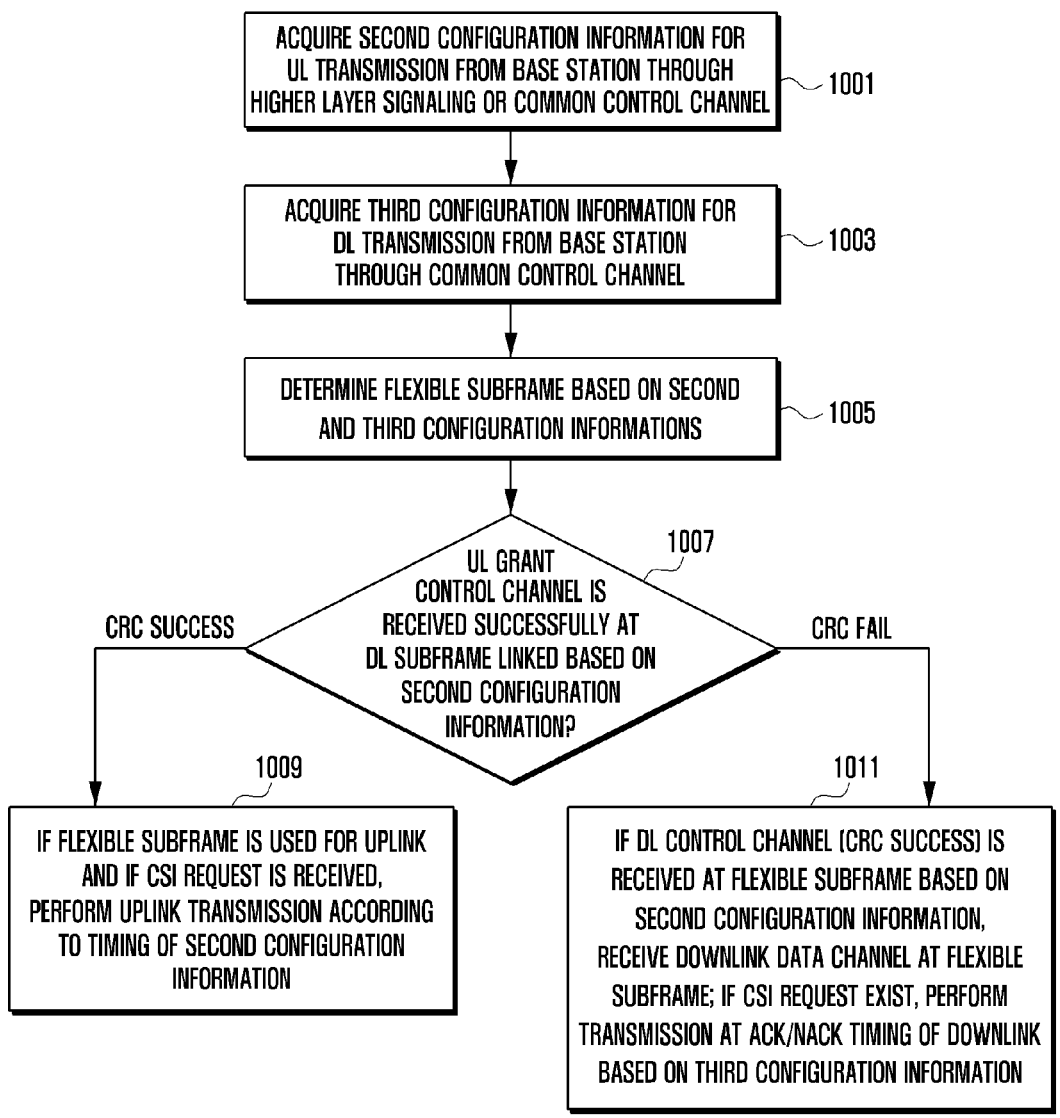
FIG. 10 is a flowchart illustrating an operation procedure of a terminal according to an embodiment of the present invention.

FIG. 10 is a flowchart illustrating an operation procedure of a terminal according to an embodiment of the present invention.

Referring to FIG. 10, the terminal receives the second configuration information for uplink transmission from the base station in step 1001. According to an embodiment of the present invention, the terminal may acquire the second configuration information through higher layer signaling or a common control channel.

In step 1003, the terminal acquires the third configuration information for downlink transmission. According to an embodiment of the present invention, the terminal may acquire the third configuration information for downlink transmission through a common control channel.

In step 1005, the terminal checks the flexible subframe based on the acquired second configuration information and the third configuration information.

In step 1007, the terminal determines whether uplink grant control channel is received successfully on the downlink subframe (whether CRC succeeds/fails), based on the second configuration information.

If the uplink grant control channel is received successfully on the downlink subframe based on the second configuration information (if CRC succeeds), the terminal checks that the flexible subframe is used for uplink in step 1009. If CRC request is received, the terminal performs CSI feedback on the uplink data channel according to the timing of the reference configuration information 2.

If the terminal fails to receive uplink grant control channel at the downlink subframe based on the second configuration information (if CRC fails) and if downlink control channel is received at a flexible subframe using the second configuration information, the terminal receives the downlink data channel at the flexible subframe, and otherwise, if the control channel includes CSI request, performs CSI feedback at ACK/NACK timing of the downlink based on the third configuration information in step 1011. If the ACK/NACK timing of the downlink is not uplink based on the second configuration information, the terminal does not perform transmission.

This terminal operation is commonly applicable to the above-described embodiments.

Figure 11:
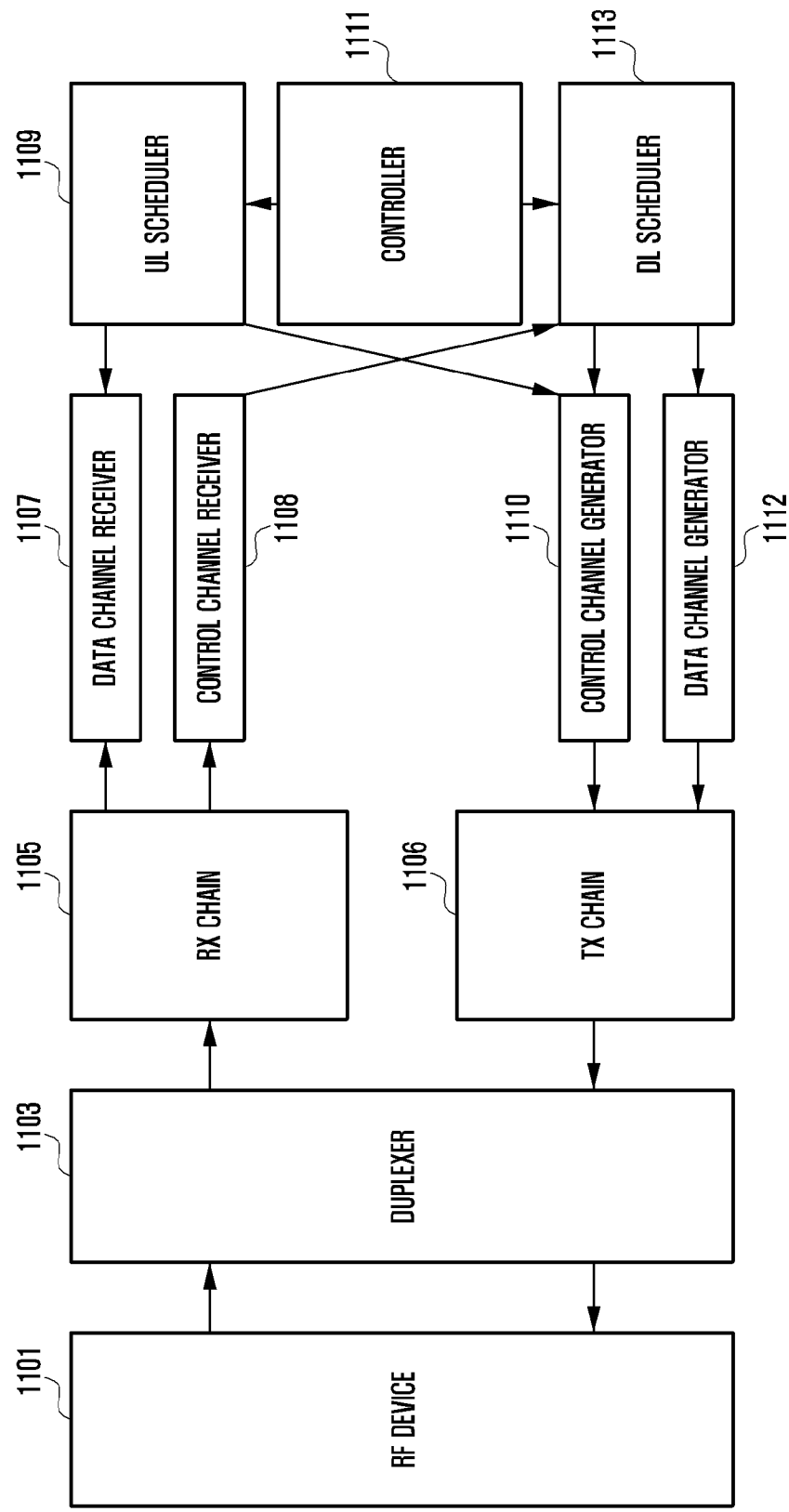
FIG. 11 is a block diagram illustrating a configuration of a base station according to an embodiment of the present invention.

FIG. 11 is a block diagram illustrating a configuration of a base station according to an embodiment of the present invention.

Referring to FIG. 11, the base station includes a Radio Frequency (RF) device 1101, a duplexer 1103, an Rx chain 1105, a Tx chain 1106, a data channel receiver 1107, a control channel receiver 1108, control channel generator 1110, a data channel generator 1112, a UL scheduler 1109, a controller 1111, and a DL scheduler 1113.

The controller 111 operates the downlink scheduler 1113 and the uplink scheduler based on different configuration information and uses the second configuration information for uplink scheduling and the third configuration information for downlink scheduling. The downlink scheduler 1113 uses the control channel generator 1110 and the data channel generator 1112 and control channel receiver 1108 to transmit scheduling information and data channel to the terminal, and when using the flexible subframe for downlink, transmits the downlink scheduling information and data channel at the corresponding subframe and receives the acknowledgement channel corresponding to the data channel through the control channel receiver 1108 at the reception timing of the third configuration information. The uplink scheduler 1109 controls the control channel generator 1110 and the data channel receiver 1107 to receive the uplink data channel transmitted by the terminal and determines the transmission timings based on the second configuration information. The controller 1111 operates the Rx chain 1105 by controlling the duplexer 1103 to operate in reception mode based on the second configuration information from the RF device 1001 and switches the operation mode of the duplexer 1103 to the transmission mode based on the third configuration information from the RF device 1101, the generated control and data channels being transmitted to the terminal.

Figure 12:
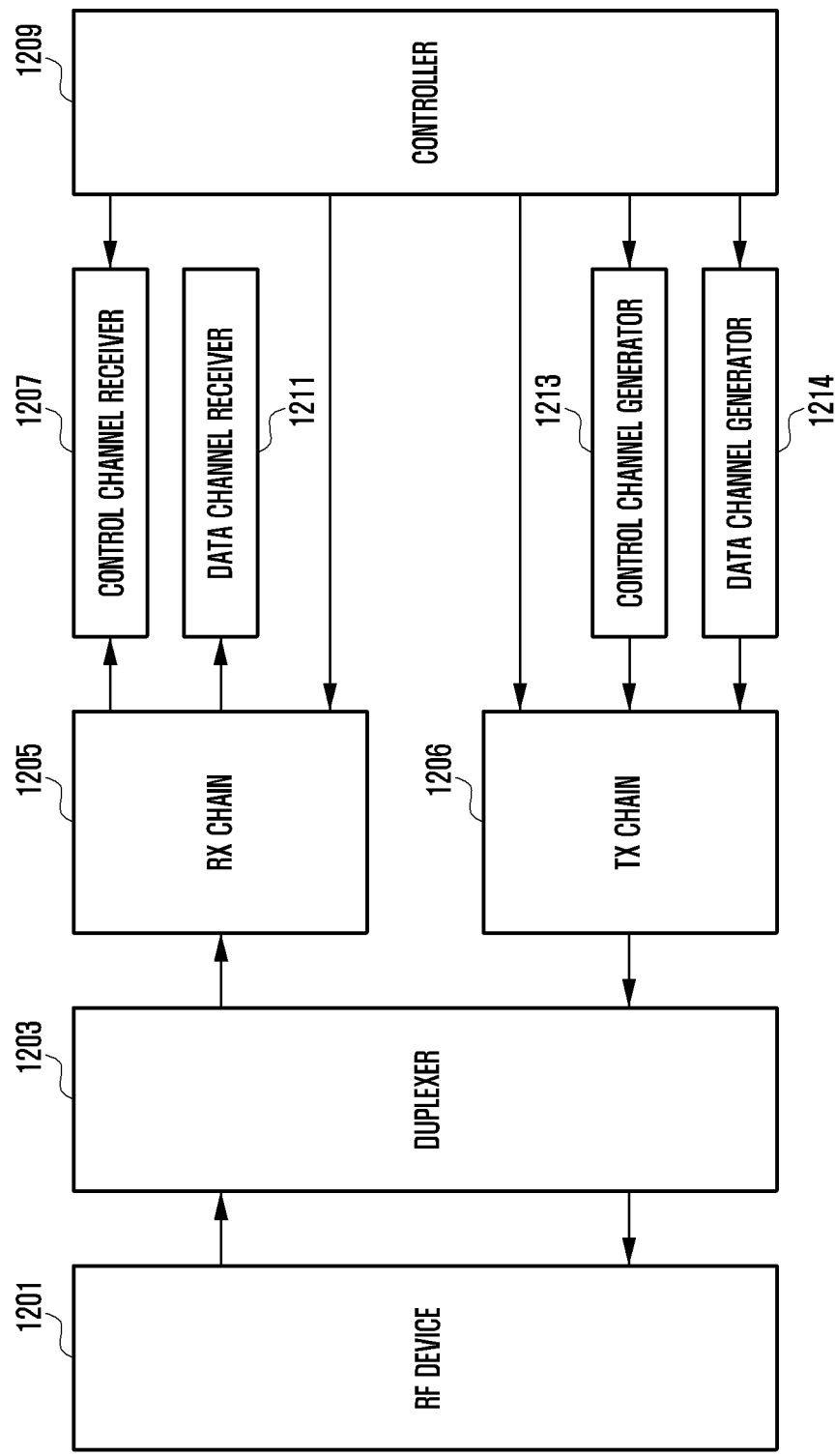
FIG. 12 is a block diagram illustrating a configuration of a terminal according to an embodiment of the present invention.

FIG. 12 is a block diagram illustrating a configuration of a terminal according to an embodiment of the present invention.

Referring to FIG. 12, the terminal includes an RF device 1201, a duplexer 1203, an Rx chain 1205, a Tx chain 1206, a control channel receiver 1207, a data channel receiver 1211, a control channel generator 1213, a data channel generator 1214, and a controller 1209.

In order to perform uplink data transmission using the second configuration information and the third configuration information received from the base station, the controller 1209 controls the RF device 1201, the duplexer 1203, and the Tx chain 1206 to operate in the transmission mode, such that the control and data channels generated by the control channel generator 1213 and the data channel generator 1214 are transmitted according to the timings of the third configuration information and the second configuration information, respectively. The controller 1209 controls the RF device 1201, the duplexer 1203, and the reception chain 1205 to operate in the reception mode, such that the control and data channels are received by the control channel receiver 1207 and the data channel receiver 1211 according to the timings of the second configuration information and the third configuration information, respectively.

As described above, a dynamic TDD operation method and apparatus according to an embodiment of the present invention allows a base station to separately handle uplink transmission/retransmission timing configuration and downlink transmission/retransmission configuration in order to adjust a downlink transmission resource amount independently of an uplink transmission resource amount, and vice versa. Consequently, it is possible to dynamically adjust the uplink and downlink resource amount based on the two configuration information, without extra modification of the system information.

A dynamic TDD operation method and apparatus according to an embodiment of the present invention adjusts resource amounts in uplink configuration information and downlink configuration information, using a terminal-specific control channel, and reduce signaling overhead through pre-configuration of available combinations of two types of configuration information.

The specification and drawings are to be regarded in an illustrative, rather than a restrictive sense, in order to help understand the present disclosure. It is obvious to those skilled in the art that various modifications and changes can be made thereto without departing from the broader spirit and scope of the disclosure.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A signal transmission and reception method of a terminal in a communication system, the method comprising:
   receiving, from a base station, first information for a first uplink-downlink (UL-DL) configuration;
   receiving, from the base station, second information for a second UL-DL configuration and third information for a subframe to monitor first control information;
   receiving, from the base station, first control information on a control channel of a first subframe, wherein the first control information is associated with the second UL-DL configuration, and the first subframe is identified based on the third information;
   receiving, from the base station, second control information on a control channel of a second subframe, wherein the second control information is associated with data, and the second subframe is identified based on the second UL-DL configuration;
   receiving, from the base station, the data based on the second control information; and
   transmitting, to the base station, a response corresponding to the data on a third subframe, wherein the third subframe is identified based on the second UL-DL configuration.

2. The method of claim 1, wherein the second control information comprises a request for channel status information (CSI) associated with the second subframe.

3. The method of claim 1, wherein the transmitting the response comprises:
   transmitting, if a request for channel status information (CSI) is included in the second control information, the response corresponding to the data including a CSI associated with the second subframe to the base station based on the second UL-DL configuration.

4. The method of claim 1, wherein receiving the first information comprises receiving, from the base station, the first information on a system information block.

5. The method of claim 1, wherein the second information is received on a dedicated higher layer signal.

6. A signal transmission and reception method of a base station in a communication system, the method comprising:
   transmitting, to a terminal, first information for a first uplink-downlink (UL-DL) configuration;
   transmitting, to the terminal, second information for a second UL-DL configuration and third information for a subframe to monitor first control information;
   transmitting, to the terminal, the first control information on a control channel of a first subframe, wherein the first control information is associated with the second UL-DL configuration, and the first subframe is identified based on the information on the subframe;
   transmitting, to the terminal, second control information on a control channel of a second subframe, wherein the second control information is associated with data, and the second subframe is identified based on the second UL-DL configuration;
   transmitting, to the terminal, the data based on the second control information; and
   receiving, from the terminal, a response corresponding to the data on a third subframe, wherein the third subframe is identified based on the second UL-DL configuration.

7. The method of claim 6, wherein the second control information comprises a request for channel status information (CSI) associated with the second subframe.

8. The method of claim 6, wherein the receiving the response comprises:
   receiving, if a request for channel status information (CSI) is included in the second control information, the response corresponding to the data including a CSI associated with the second subframe to the base station based on the second UL-DL configuration.

9. The method of claim 6, wherein transmitting the first information comprises transmitting, to the terminal, the first information on a system information block.

10. The method of claim 6, wherein the second information is transmitted on a dedicated higher layer signal.

11. A terminal for transmitting and receiving a signal in a communication system, the terminal comprising:
a transceiver configured to transmit and receive a signal; and
a controller configured to:
receive, from a base station, first information for a first uplink-downlink (UL-DL) configuration,
receive, from the base station, second information for a second UL-DL configuration and third information on a subframe to monitor first control information,
receive, from the base station, first control information on a control channel of a first subframe, wherein the first control information is associated with the second UL-DL configuration, and the first subframe is identified based on the information on the subframe,
receive, from the base station, second control information on a control channel of a second subframe, wherein the second control information is associated with data, and the second subframe is identified based on the second UL-DL configuration,
receive, from the base station, the data based on the second control information, and
transmit, to the base station, a response corresponding to the data on a third subframe, wherein the third subframe is identified based on the second UL-DL configuration.

12. The terminal of claim 11, wherein the second control information comprises a request for channel status information (CSI) associated with the second subframe.

13. The terminal of claim 11, wherein the controller is further configured to transmit, if a request for channel status information (CSI) is included in the second control information, the response corresponding to the data including a CSI associated with the second subframe to the base station based on the second UL-DL configuration.

14. The terminal of claim 11, wherein the controller is further configured to receive, from the base station, the first information on a system information block.

15. The terminal of claim 11, wherein the second information is received on a dedicated higher layer signal.

16. A base station for transmitting and receiving a signal in a communication system, the base station comprising:
a transceiver configured to transmit and receive a signal; and
a controller configured to:
transmit, to a terminal, first information for a first uplink-downlink (UL-DL) configuration,
transmit, to the terminal, second information for a second UL-DL configuration and third information for a sub frame to monitor first control information,
transmit, to the terminal, first control information on a control channel of a first subframe, wherein the first control information is associated with the second UL-DL configuration, and the first subframe is identified based on the information on the subframe,
transmit, to the terminal, second control information on a control channel of a second subframe, wherein the second control information is associated with data, and the second subframe is identified based on the second UL-DL configuration,
transmit, to the terminal, the data based on the second control information, and
receive, from the terminal, a response corresponding to the data on a third subframe, wherein the third subframe is identified based on the second UL-DL configuration.

17. The base station of claim 16, wherein the second control information comprises a request for channel status information (CSI) associated with the second subframe.

18. The base station of claim 16, wherein the controller is further configured to receive, if a request for channel status information (CSI) is included in the second control information, the response corresponding to the data including a CSI associated with the second subframe to the base station based on the second UL-DL configuration.

19. The base station of claim 16, wherein the controller is further configured to transmit, to the terminal, the first information on a system information block 1 (SIB1).

20. The base station of claim 16, wherein the second information is transmitted on a dedicated higher layer signal.

* * * * *